United States Patent [19]
Laurenti

[11] 3,827,316
[45] Aug. 6, 1974

[54] METHOD OF PRODUCING NEW SCISSORS

[76] Inventor: Italo Marco Levi Laurenti, 432 Park Ave., South, New York, N.Y. 10016

[22] Filed: July 16, 1973

[21] Appl. No.: 379,585

[52] U.S. Cl. ................... 76/104 A, 30/254, 29/434, 29/453, 29/463, 156/73
[51] Int. Cl. ............................................. B21k 11/06
[58] Field of Search ............ 76/104 A, 105; 29/463, 29/453, 434; 156/73; 30/341, 254, 164

[56] References Cited
UNITED STATES PATENTS

| | | | |
|---|---|---|---|
| 2,776,482 | 1/1957 | Hafekost | 76/104 A |
| 3,164,038 | 1/1965 | Ahlbin | 76/104 A |
| 3,527,277 | 9/1970 | Woods | 156/73 X |

FOREIGN PATENTS OR APPLICATIONS

| | | | |
|---|---|---|---|
| 1,018,370 | 1/1966 | Great Britain | 156/73 |

*Primary Examiner*—Leonidas Vlachos

[57] ABSTRACT

In a preferred embodiment, a process, and resulting scissors product, including cold-stanping each of the commonly shank-pivoted opposing blade-shank-handle strips from sheet-steel and bending at least one of the strips between the shank and handle portions thereof, and after cutting-out a ring-plug from each handle to thereby form the scissor rings, for each ring inserting from opposite top and bottom faces of the ring opposing abuttable inserts each insert having a laterally outwardly extending flange which overhangs the respective ring's upper or lower surface — as the case may be — such that upon subsequent securing-together thereof of the opposing inserts the ring is vise-clamped therebetween.

6 Claims, 5 Drawing Figures

```
FLAT METAL SHEET
   ├── SCISSOR BLADE-SHANK-HANDLE CUT-TO-SIZE
   ↓    BY COLD STAMPING
FLAT CUT-TO-SIZE SCISSOR BLADE-SHANK-HANDLE
   ├── PUNCH RING AND SCREW HOLES
   ↓
HOLED FLAT SCISSOR HALF
   ├── HEAT TEMPERING, GRINDING,
   ↓    SHARPENING, ETC.
CONDITIONED SCISSOR HALF
   ├── BEND SCISSOR HALF TO SHAPE
   ↓
READIED SCISSOR HALF
   ├── INSERTING AND ANCHORING ── { PRE-READING
   ↓    PLASTIC RINGS              { PLASTIC RINGS
COMPLETED SCISSOR HALF
   ├── ASSEMBLING OPPOSING SCISSOR HALVES
   ↓
COMPLETED SCISSORS
```

FIG. 1

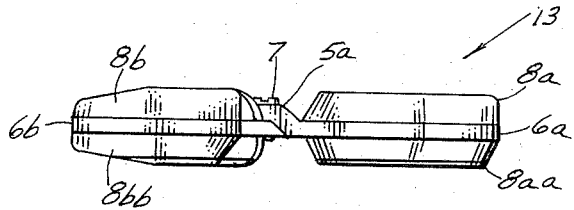

FIG. 3

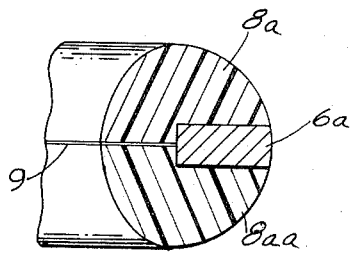

FIG. 4

METHOD OF PRODUCING NEW SCISSORS

This invention relates to a novel method of producing improved scissors and/or shears.

BACKGROUND TO THE INVENTION

Prior to the present invention, in order to obtain scissor-handle rings aligned in a common plane, the prior scissors' opposing flat-faced shanks and blades were forged from a hot rod into the stepped shapes, and thereafter precise and careful machining thereof was necessary to obtain proper blade and pivot screw-hole registration and alignment for the two opposing shanks and blades, together with associated high cost of manufacture. Also, in order to obtain plastic-handle rings, it was necessary to employ injection molding of the plastic rings, and thereafter to insert axially a handle projection extending from the shank, into a ring-handle mounting-recess in a snug fit and securing thereon the molded ring-handle. Such die-molding and mounting are expensive and also the ring-handle mounted on the projection end characteristically becomes loose and/or broken from the shank handle projection.

Also, utilizing rod-forged scissor handle-shank-blade pieces, with the shank-handle step for effecting proper alignment of opposing scissor rings, difficulty often was experienced in consistently obtaining uniform seating of a shank-blade in a vise-seat preparatory to grinding, sharpening, etc.

SUMMARY OF THE INVENTION

Accordingly, an object of the present invention is to obtain a process which avoids and/or overcomes one or more of the difficulties and problems of the type discussed above, together with other novel advantages.

In particular, another object is to obtain a novel process of manufacture of scissors with resulting scissors of equal or better durability, alignment, performance characteristics, and the like.

Another advantage and object of the present invention is the obtaining of a simplified process and different working raw materials resulting in less labor required and reduced skill whereby a high quality product is made available to the public at reduced cost and therefore at reduced price.

Other advantages become apparent from the preceding and following disclosure.

One or more objects of the present invention are obtained by the invention as defined herein.

Broadly the invention includes a novel process of manufacture taking a new approach to the manufacture of scissors, and accordingly the scissor products also being materially different from prior scissors in their physical make-up and performance, the process broadly including cold-stamping from sheet metal the complete outline of the scissor blade-shank-handle piece for each of opposing scissor halves, cutting or punching-out the ring hole in the handle portion of the cold-stamped strip piece, otherwise subjecting the blade portion to conventional processing such as heat-tempering, grinding, sharpening, and the like, and thereafter bending the strip piece shank portion adjacent the ring of at least one of two strip pieces to be matched. Thereafter, the pieces are conventionally commonly pivotably mounted on a common screw or brad or the like. In a preferred embodiment, there is mounted on each ring, normally before the pivotal mounting of the shank, a handle cover member preferably plastic composed of two separate inserts for each ring with each insert inserted from an opposite direction and side of the ring from an opposing insert such that the opposing inserts meet in an abutting relationship to be thereafter secured preferably by ultrasonic welding of the abutting plastic at one or more points by heat fusion, but it also being possible to employ adhesive with or without the welding. Accordingly, the handle plastic cover, composed of two abutting inserts with each having a handle-overlapping laterally extending flange either outwardly or inwardly, clamps the ring between the secured opposing inserts. Although the term insert is used, and although in a preferred embodiment the abutting portions of the opposing inserts are extending through the ring, it is equally possible for the abutting portions to be on an outer periphery of the respective ring with or without inner-ring abutting portions. Similarly, although preferably solely one of the cold-stamped strip pieces is bent sufficiently to align the handle portion thereof with the handle portion of an unbent cold-stamped strip piece when their shanks are opposingly commonly mounted on a screw or brad, it is equally possible to bend each of both strip pieces half the thickness of the other in order that the handle rings of each will be aligned in a common plane when pivotably mounted. However, the bending of one is preferred if for no other reason that fewer pieces have to be bend with equally good result. The thereby-produced opposing piece-strips are easily mounted on the screw or brad without any problem of matching the screw or brad holes of each together with no problems of matching heretofore prior-art rod-forged step-portions of the shank(s) thereof, as well as the preferred plastic cover not having to be injection-molded (prior art) but prereadied and joined together. It should be also noted that the insert portions need not both extend toward the opposing insert, one possibly and equally-well being a mere wide flange a part of which becomes abutted with a projection from an opposite insert extending through or around the outer periphery of the ring to bring-about the required abutment. Also, although for durability and sturdiness it is preferred that the securing together of the opposing inserts be by welding and/or adhering one to the other along the line of abutment, it is equally possible but not preferred that the opposing ring inserts be so-shaped as to automatically preferably fixedly (permanently) lock into one-another by hook and catch or other conventional mechanism(s), whereby no welding and/or adhering would be required. It is equally apparent that by the process of the present invention, at least one of the piece strips must be bent.

The invention may be better understood by reference to the following Figures.

THE FIGURES

FIG. 1 is a graphic flow-chart of the process of the present invention in a preferred embodiment thereof.

FIG. 2A and FIG. 2B are each side-elevation top perspective views of opposite sides of the completed scissors of the present invention, the blades being shown in phantom because of the major novelty being the combined shaping peripherally of the shank (along with other portions) of the scissor strip and the bending thereof subsequent to the cold-cutting, versus the rod-forged stepped shank and handle of prior-art scissors.

FIG. 3 illustrates an elevation end view taken along lines 3—3 of FIG. 2A.

FIG. 4 illustrates a cross-sectional view as taken along lines 4—4 of the handle ring and plastic cover of secured opposing inserts thereof.

DETAILED DESCRIPTION OF THE INVENTION

FIG. 1 illustrates a flow chart of a preferred process of the invention, and as show begins with a flat metal sheet being cut to size by cold-stamping to stamp-out of cold metal sheet of preferably steel, an exact scissor strip-piece having substantially the final shape of one continuous blade-shank-handle of scissors from which thereafter the handle rings are completed by cutting or punching the ring-holes in the flat handle portion and the screw or brad hole in the shank portion. This is followed as shown, by conventional scissor processing, such as heat tempering the blade portion, grinding, sharpening, polishing, and the like, resulting in a so-called conditioned scissor half eventually to be paired with another substantially like opposing piece. After the conditioning above-noted, the shank portion is bent in somewhat z-fashion (except not to that extent) to cause the handle portion and hole-containing shank portion and blade portion to extend in about parallel planes, the blade and shank continuing to extend in a common plane, with the bend portion off-setting the handle portion about the thickness of the metal strip such that the handle portion will extend in about a common plane with the handle portion of a matched opposing unbent strip when commonly pivoted on a pin or screw or brad or the like anchored in the commonly matched and registered pivot holes. After the bending, the pre-readied plastic ring inserts are mounted from opposite sides of the ring to come into the abutting relationship thereupon the abutted portions being anchored to eachother thereby mounting the plastic inserts onto the ring as a partial or total ring cover, giving a completed scissor half. Thereafter the half is commonly mounted on a pin noted above to give the completed scissors.

Figure 2A:
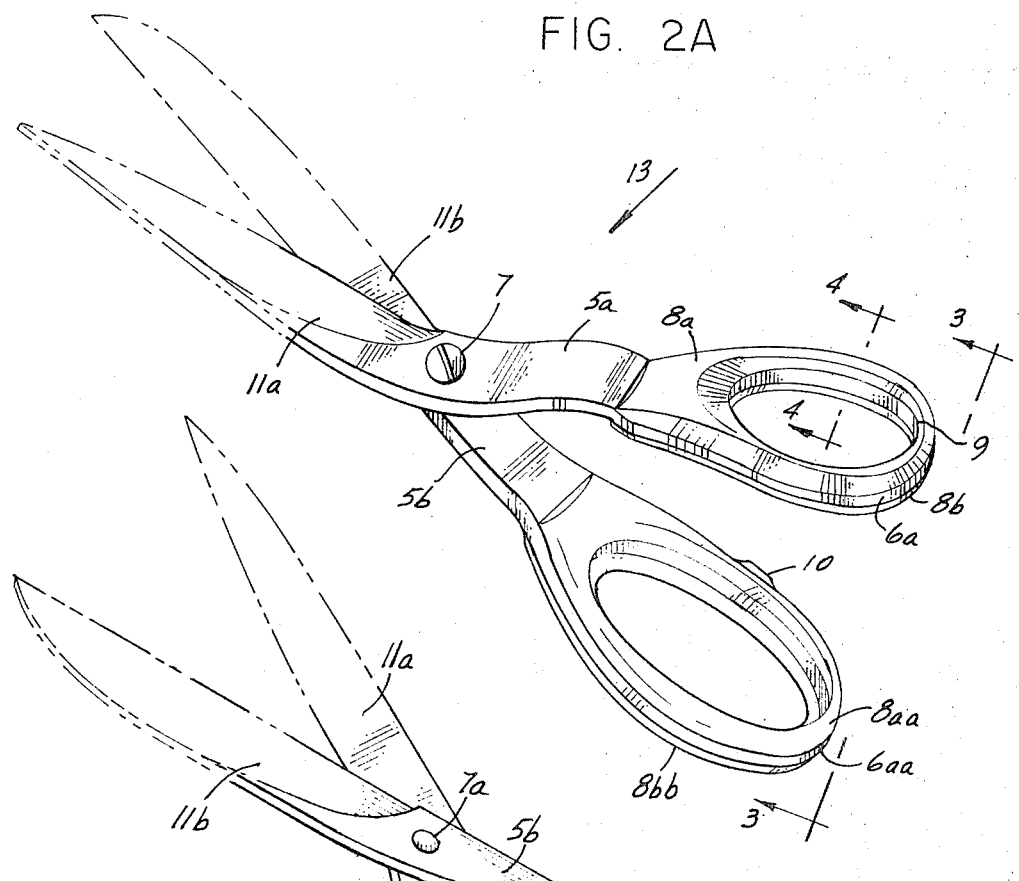
Figure 2B:
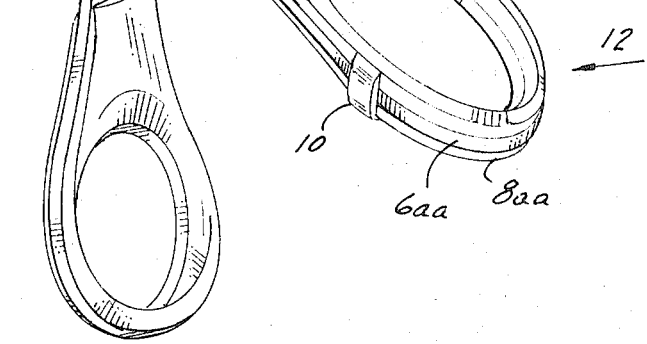

Accordingly FIGS. 2A and 2B illustrate the appearance of a preferred scissors produced by the above-noted process, including the unbent scissor half including blade portion 11b, shank portion 5b and handle ring portion 6aa having outer insert portion 8bb and inner insert portion 8aa, this being the unbent portion or piece of scissors 4, and the bent scissor-half piece including blade 11a, shank 5a having an off-setting bend therein, ring 6a, outer insert 9 and inner insert 8b, the two halves being commonly mounted on screw-pin 7 through the registered holes of the respective holes therein. The scissors as illustrated as scissors 4 illustrates one side of the scissors, while the FIG. 2 scissors identified as scissors 12 represent the opposite side of the same or identical scissors as of Figure, the numeral 4 thus representing one face thereof and numeral 12 the opposite face thereof.

Similarly FIGS. 3 and 4 illustrate the same embodiment, FIG. 3 as taken along lines 3—3 of FIG. 2A and FIG. 4 as taken along line 4—4 of FIG. 2A. The purpose of FIG. 3 is principally to illustrate in end elevation view the common-plane of alignment of the opposing rings and the one-half being bent in open-z fashion to off-set the ring thereof to the common-alignment position of rings 6a and 6b by virtue of bent shank 5a as viewing end view 13 portions. It is also noteworthy that the rings opposing inserts of one ring need not be identical in shape as for the other ring, just as the rings as illustrated may differ in shape as do conventional scissors, also FIGS. 2A and 2B illustrating an intermediate cushion abutting guard 10. The FIG. 4 additionally illustrates an embodiment in which the outer insert 8a extends through the ring 6a with an overlapping upper flange portion over the ring 6a, while a projection extends through the ring hole to meet the upwardly extending projection of the inner ring insert having a flange extending beneath the ring 6a, with the adhesive layer 9 adhering together the abutting inserts 8a and 8aa. Accordingly the two blades are exactly superimposed and at the same time the two handles share the same level without prior art rings set against each other in the two opposing arms of the scissors and without the associated problems thereof of proper registration and alignment thereof and of the pin holes respectively and concurrently, permitting the elimination of other heretofore indispensable manual finishing operations, and the prior necessity of continuous registration, and the like. The bending feature, a part of the heart of the present invention, together with the sheet-steel cold-stamping, thus eliminates the heretofore required counter-positioning-gauging in the two opposing arms of the scissors, as well as the simple mounting of inserts instead of injection handles made entirely of plastic material, the present handles of this invention having an additional advantage of being firmly and strongly reinforced by the metal ring itself while nevertheless having the comfortable feel of the shaped plastic inserts mated together.

In addition to the inventive features of the process combination as described above, the manufacturing process also includes conventional steps such as grinding of the external blades, drilling and possibly tapping, tempering, sharpening of the internal blades, mounting of the link-screws, registering, as well as other conventional phases — where desired — such as polishing of the surfaces, nickeling, and chroming. With the present inventive process, scissors of whatever type desired can be obtained, as described above, with completely automatized work cycles, on an industrial and no-longer handicraft scale, which in essence means a uniform production and quality, and production of much larger quantities at lower overall costs than possible heretofore.

It is within the scope and spirit of the present invention to make such modifications and variations and substitutions of equivalents as would be apparent to a person of ordinary skill in this particular art.

I claim:

1. A process for making scissors comprising in combination: employing a sheet of steel; employing a die-stamp cutting means including metal-cutting edges extending in a common direction from a circumscribing periphery of the cutting means and defining a predetermined shape of a continuous blade portion, shank portion, and handle portion serially in that order, and further including press means for stamping the metal-cutting edges against a flat face of the steel sheet; pressing said metal-cutting edges against a flat face of the steel sheet while the steel sheet is in a substantially cold state temperature-wise, sufficiently to cut a metal strip from the sheet, in said predetermined shape; cutting finger space through said metal strip's handle portion sufficiently to thereby define a scissor ring; cutting a shank screw through-hole in the metal strip's shank portion; bending the metal strip's shank portion adjacent the scissor ring in a scissor-ring off-set direction sufficiently for matching the scissor ring with a scissor ring of an opposing scissor ring of another scissor strip to be pivotably mounted commonly on a screw through said shank screw through-hole; preshaping two separate substantially mirror-image ring inserts each having laterally extending flanges overlapable of one an upper ring-surface and the remaining on a lower ring-surface, uprightly extending portions of the respective opposing inserts extending each respective predetermined distances such that when inserted in the scissor ring from opposite upper and lower sides of the scissor ring the uprightly extending opposing inserts' portions are engageable with one-another; inserting the separate ring inserts toward one another; from above and below respectively the scissor ring such as to abut one insert's upright-extending portion against the other insert's upright-extending portion; and securing together the opposing inserts in the abutted state.

2. A process of claim 1, in which steps thereof are in the order of sequence listed, and in which said bending step precedes said inserting.

3. A process of claim 2, including repeating preceding steps except minus a bending step, and mounting the thereby two separate scissor strips in scissor-opposing relationship on a common screw through the screw hole of each of the respective scissor strips.

4. A process of claim 3, including for each scissor strip, the steps of heat tempering, grinding, and sharpening subsequent to said pressing and prior to said bending.

5. A process of claim 4, in which said securing includes heat-fusing said abutted-state opposing-inserts' upright-extending portions.

6. A process of claim 1, in which said securing includes heat-fusing said abutted-state opposing-inserts upright-extending portions.

* * * * *